Jan. 31, 1950  H. C. CAIN  2,495,694
MECHANICAL RESECTOR
Filed Sept. 8, 1948  2 Sheets-Sheet 1
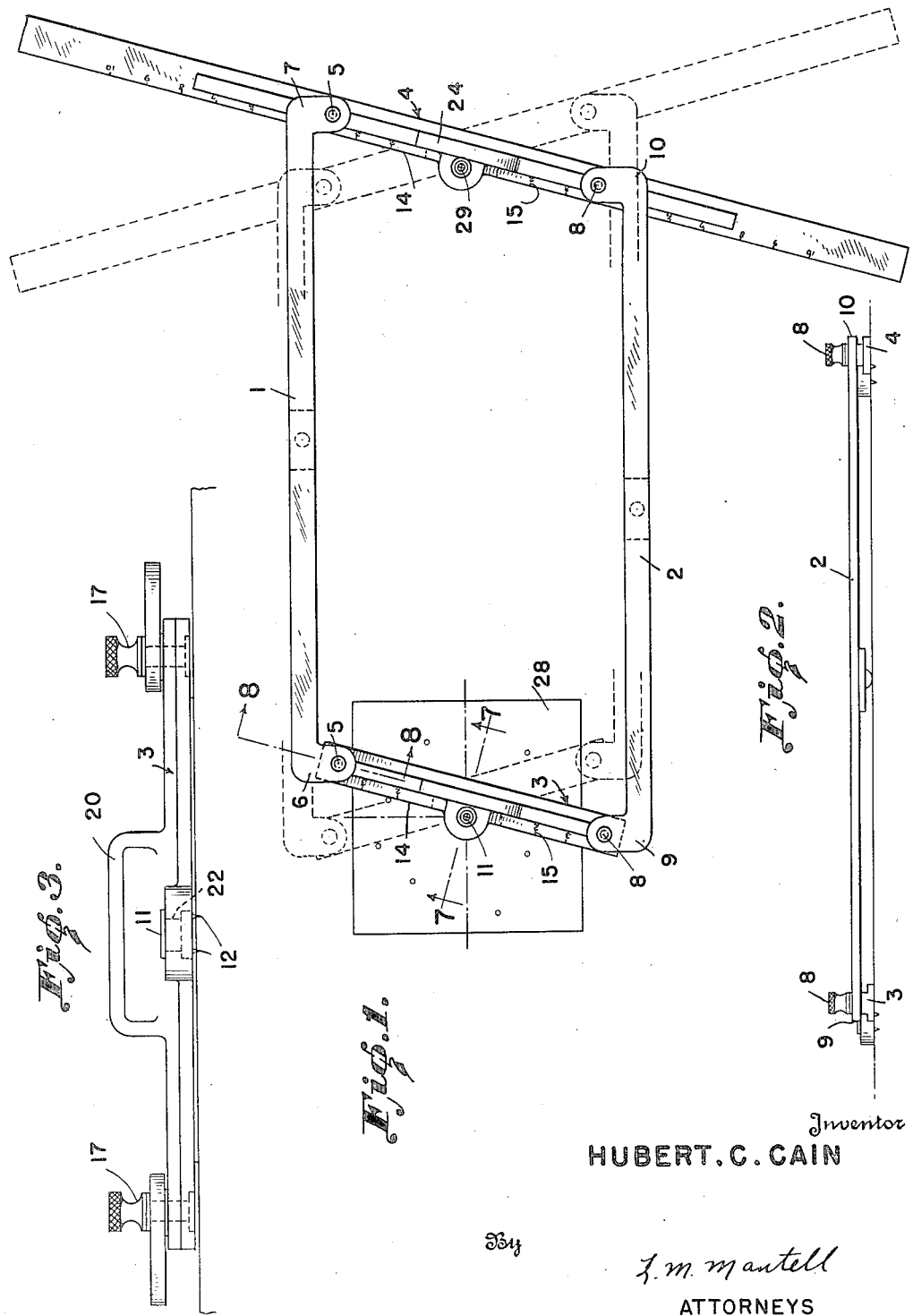
Inventor
HUBERT. C. CAIN
By
J. M. Mantell
ATTORNEYS Jan. 31, 1950          H. C. CAIN          2,495,694
MECHANICAL RESECTOR
Filed Sept. 8, 1948          2 Sheets-Sheet 2
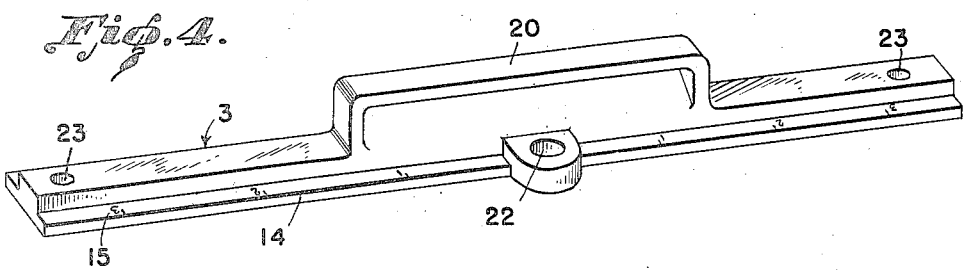
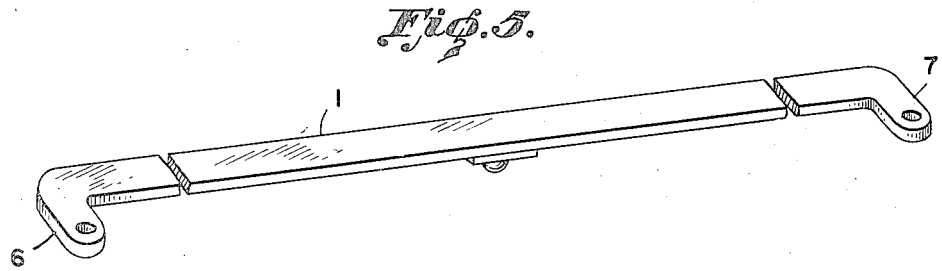
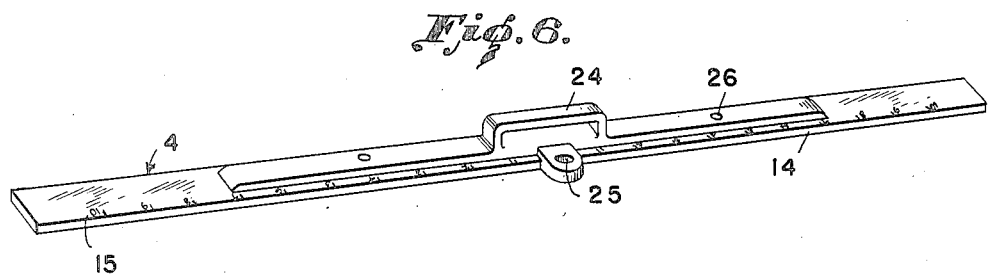
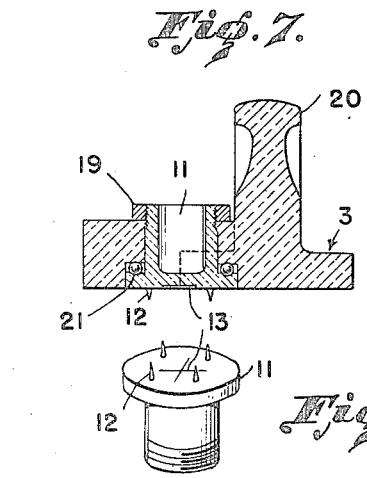
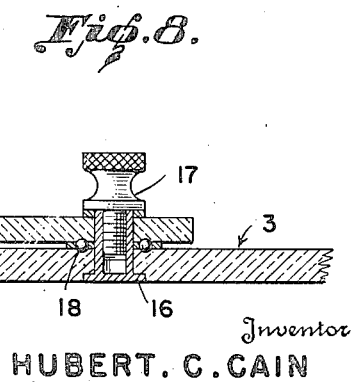
Inventor
HUBERT. C. CAIN
By
L. M. Mantell
ATTORNEYS Patented Jan. 31, 1950

2,495,694

UNITED STATES PATENT OFFICE 2,495,694

MECHANICAL RESECTOR

Hubert C. Cain, Alexandria, Va.; dedicated to the free use of the People in the Territory of the United States Application September 8, 1948, Serial No. 48,308

2 Claims. (Cl. 33—76)

(Granted under the act of March 3, 1883, as amended April 30, 1928; 370 O. G. 757)

This application is made under the act of March 3, 1883, as amended by the act of April 30, 1928, and the invention herein described, if patented in any country may be manufactured and used by or for the Government of the United States of America for governmental purposes throughout the world without the payment to me of any royalty thereon.

I hereby dedicate the invention herein described to the free use of the People in the Territory of the United States to take effect on the granting of a patent to me.

This invention relates to a device for locating points and checking detail in topographic or planimetric maps constructed by photogrammetric methods.

An object of this invention is to devise means for rapidly and accurately transferring points directly from the aerial photograph to the control base, map, or manuscript, by the principle of radial lines.

A further object of this invention is an apparatus capable of use for checking the finished map against aerial photographs, to determine its accuracy.

An embodiment of the device is shown in the drawings, in which:

Figure 1 is a plan view; Figure 2 is an end view; Figure 3 is a side view; Figures 4 and 5 and 6 are detailed views of the arms; Figure 7 is a section on line 7—7 of Fig. 1; Figure 8 is a section on line 8—8 of Fig. 1, and Fig. 9 is a detailed view of a pivot post.

The apparatus comprises a pivotally jointed parallelogram having two long arms 1 and 2, and side arms 3 and 4. The centers of the pivots 5 and 8 are off-set from the inner edges of arms 1 and 2 a sufficient distance to permit 180 degree rotation of side arms 3 and 4 with respect to the arms 1 and 2. For this purpose pivots 5 are located upon projections 6 and 7 on arm 3, pivots 8 being located upon projections 9 and 10.

Arm 3 is provided at its mid-point with a pivot-post 11 having four prongs 12 and cross lines 13. Pivot-post 11 is made of transparent plastic, in order that the cross-point of the cross-lines may be accurately located upon the map or photograph. The cross-point of the hair lines is in alignment with the edge 14 of arm 3. This edge has a scale of length 15. Arm 4 is provided with an identical pivot-post 29, having like cross-hairs with a cross-point in alignment with the edge 14 of arm 4. Edge 14 is also provided with a length scale 15.

At pivot points 5 and 8 there is a conventional internally screw-threaded bushing 16 to which is fastened screw 17. To reduce friction an annular bearing 18 may be placed between the arms.

Pivot post 11 is held in position by threaded ring 19. Bearings 21 reduce friction.

Arm 3 is provided with a handle 20, a central pivot post hole 22 and terminal pivot holes 23. Arm 4 is also provided with a handle 24, central pivot hole 25 and parallelogram pivot holes 26.

In operation, the pivot post 11 is placed over a principal reference point of an aerial photograph 28. The pivot post 29 of the drawing arm 4 is likewise fixed in position upon the corresponding principal point of the proposed map. The photo arm is then aligned with a radial reference or central point on the photograph. This automatically turns drawing arm 4 through the same angle about pivot 29. The point corresponding to the photoradial reference point is then laid off the same distance, or a proportionally greater distance from the pivot point, when enlargement is desired.

In the point location process, the centering device on the drawing arm is placed directly over the position of the principal point of the photograph concerned, as it appears on the control sheet. The drawing arm is then rotated into alignment with a convenient radial point or points. With the resector in this position, the photograph is then oriented under the photo arm to its corresponding position and fixed into place.

Radial lines are then drawn directly on the base sheet for any desired point on the photograph. By repeating this procedure with adjacent photos the correct positions of the points are located by intersections.

Checking of the finished map against an aerial photograph is done in the reverse manner.

Having thus described my invention, I claim:

1. A device for use in making maps from aerial photographs comprising a pivotally jointed parallelogram, the four joint pivots of which are fixed in position on and equidistantly and inwardly off-set from the inside edges of two opposite, longitudinal, long arms of the parallelogram, each end of the long arms having an inward projection upon which the joint pivots are located, the parallelogram having two short side arms that underlie the said projections, whereby the side arms may be rotated about 180 degrees with respect to the two long arms in a plane below the latter, a straight edge on the outer edge of one short arm, a straight edge on the inner edge of the other short arm, pivot means at the mid-point of each short side arm, the center of each pivot means being in alignment with each straight edge, said pivot means including means to fix and attach said mid-points in position on the photograph and map respectively, each said pivot means providing a pivot about which each short arm can be turned, each straight edge having indicia corresponding to distance from the center of each of the pivot means.

2. A device for use in making maps from aerial photographs comprising a pivotally jointed parallelogram, the four joint pivots of which are fixed in position on and equidistantly and inwardly offset from the inside edges of two opposite, longitudinal, long arms of the parallelogram, each end of the long arms having an inward projection upon which the joint pivots are located, the parallelogram having two short side arms that underlie the said projections, whereby the side arms may be rotated about 180 degrees with respect to the two long arms in a plane below the latter, a straight edge on the outer edge of one short arm, a straight edge on the inner edge of the other short arm, pivot means at the mid-point of each short side arm, the center of each pivot means being in alignment with each straight edge, said pivot means including means to fix and attach said mid-points in position on the photograph and map respectively, each said pivot means providing a pivot about which each short arm can be turned, each straight edge having indicia corresponding to distance from the center of each of the pivot means; the pivot means each comprising a pivot post rotatably mounted in each side arm and having means on its lower face, by which it may be fixed in position on the photograph or map, and having a visible pivot point indicium.

HUBERT C. CAIN.

REFERENCES CITED

The following references are of record in the file of this patent:

UNITED STATES PATENTS

| Number | Name | Date |
| --- | --- | --- |
| 692,794 | Morley | Feb. 4, 1902 |
| 1,872,578 | Hampton | Aug. 16, 1932 |
| 1,933,880 | Tihenko | Nov. 7, 1933 |
| 2,073,881 | Ronnquist | Mar. 16, 1937 |
| 2,428,310 | Hendry | Sept. 30, 1947 |

FOREIGN PATENTS

| Number | Country | Date |
| --- | --- | --- |
| 146,788 | Germany | Dec. 17, 1903 |